(12) United States Patent (10) Patent No.: US 9,144,905 B1
Sinapov et al. (45) Date of Patent: Sep. 29, 2015

(54) DEVICE AND METHOD TO IDENTIFY FUNCTIONAL PARTS OF TOOLS FOR ROBOTIC MANIPULATION

(71) Applicant: HRL Laboratories, LLC, Malibu, CA (US)

(72) Inventors: Jivko Sinapov, Ames, IA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 61 days.

(21) Appl. No.: 14/160,417

(22) Filed: Jan. 21, 2014

Related U.S. Application Data

(60) Provisional application No. 61/780,961, filed on Mar. 13, 2013.

(51) Int. Cl.
*G05B 19/18* (2006.01)
*B25J 9/16* (2006.01)
*G06T 17/00* (2006.01)
*G06F 3/01* (2006.01)

(52) U.S. Cl.
CPC ............. *B25J 9/1671* (2013.01); *G06F 3/016* (2013.01); *G06T 17/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,402,053 | A * | 8/1983 | Kelley et al. | 700/259 |
| 6,297,844 | B1 * | 10/2001 | Schatz et al. | 348/43 |
| 7,995,096 | B1 * | 8/2011 | Cressy et al. | 348/153 |
| 8,380,349 | B1 * | 2/2013 | Hickman et al. | 700/250 |
| 8,639,644 | B1 * | 1/2014 | Hickman et al. | 706/14 |
| 2013/0158711 | A1 * | 6/2013 | Smith et al. | 700/259 |
| 2013/0257748 | A1 * | 10/2013 | Ambrus et al. | 345/173 |
| 2013/0321586 | A1 * | 12/2013 | Kirk et al. | 348/47 |
| 2014/0354528 | A1 * | 12/2014 | Laughlin et al. | 345/156 |
| 2014/0354529 | A1 * | 12/2014 | Laughlin et al. | 345/156 |

OTHER PUBLICATIONS

R. B. Rusu, Z. C. Marton, N. Blodow, M. Dolha, and M. Beetz. Towards 3D point cloud based object household environments. Robotics and Autonomous Systems, 56(11):927-941, 2008.

B. Rasolzadeh, M. Bjorkman, K. Huebner, and S. Kragic. An active vision system for detecting, fixating and manipulating objects in the real world. International Journal of Robotics Research, 29(2-3):133-154, 2010.

Sinapov, J., Bergquist, T., Schenck, C., Ohiri, U., Griffith, S. and Stoychev, A. Interactive object recognition using proprioceptive and auditory feedback, The International Journal of Robotics Research, vol. 30(10):1250-1262, 2011.

(Continued)

*Primary Examiner* — Jonathan L Sample
(74) *Attorney, Agent, or Firm* — Tope-McKay & Associates

(57) ABSTRACT

Described is system for identifying functional elements of objects for robotic manipulation. The system causes a robot to manipulate an object, the robot having an audio sensor and touch sensors. A three-dimensional (3D) location of each audio event that produces a response during manipulation of the object is recorded. Additionally, a 3D location of each tactile event that produces a response during manipulation of the object is recorded. A 3D location of each audio and tactile event in 3D space is then determined. A 3D audio point cloud and a 3D tactile point cloud are generated. Then, the 3D audio point cloud and the 3D tactile point cloud are registered with a 3D model point cloud of the object. Finally, an annotated 3D model point cloud of the object is generated, which encodes the location of a functional element of the object.

15 Claims, 5 Drawing Sheets

(56) References Cited

OTHER PUBLICATIONS

Sukhoy, V., Sinapov, J., Wu, L., and Stoytchev, A. Learning to Press Doorbell Buttons. Proceesings of the 9th IEEE International Conference on Development and Learning (ICDL), 2010.

Rusu, R.B. and Blodow, N. and Beetz, M. Fast point feature histograms (FPFH) for 3D registration. Proceedings of the IEEE International Conference on Robotics and Automation, 2009.

Zhang, Z. Iterative Point matching of registration of Free-form Curves. Research Report No. 1658. Institut National de Recherche en Informatique et en Automatique (INRIA), France, 1992.

Frigo, M. and Johnson, S.G. FFTW: An adaptive software architecture for the FFT, Proceedings of the IEEE International Conference on Acoustics, Speech and Signal Processing, vol. 3, pp. 1381-1384, 1998.

Siciliano, B. and Jhatib, O. (Eds.), Handbook of Robotics, Springer, 2008, pp. 18-27.

Jivko Sinapov, Darren Earl, Derek Mitchell, and Heiko Hoffmann, "Interactive Audio-Tactile Annotation of 3D Point Clouds for Robotic Manipulation," ICRA Mobile Maniuplation Workshop on Interactive Perception, 2013.

\* cited by examiner

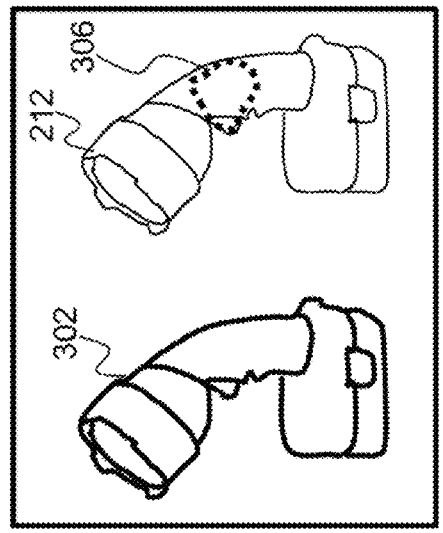
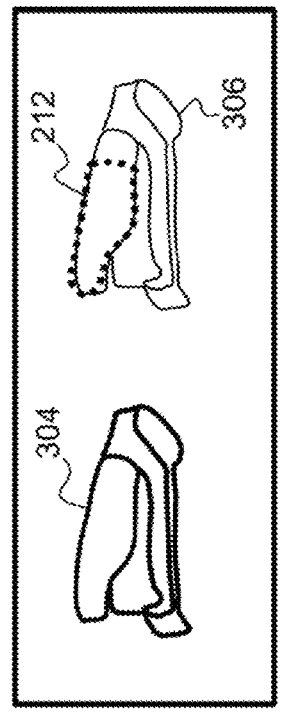
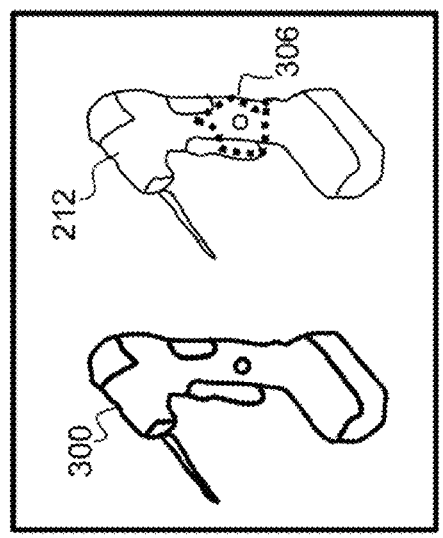

DEVICE AND METHOD TO IDENTIFY FUNCTIONAL PARTS OF TOOLS FOR ROBOTIC MANIPULATION

CROSS-REFERENCE TO RELATED APPLICATIONS

This is a Non-Provisional patent application of U.S. Provisional Application No. 61/780,961, filed in the United States on Mar. 13, 2013, entitled, "Device and Method to Identify Functional Parts of Tools for Robotic Manipulation."

GOVERNMENT LICENSE RIGHTS

This invention was made with government support under U.S. Government Contract Number W91CRB-10-C-0126. The government has certain rights in the invention.

BACKGROUND OF THE INVENTION (1) Field of Invention

The present invention relates to a system for identifying functional parts of objects for robotic manipulation and, more particularly, to a system for identifying functional parts of objects for robotic manipulation using tactile and auditory sensory feedback.

(2) Description of Related Art

Successful robotic use of hand-held tools (e.g., drills, staplers, flashlights) requires that a robot is capable of detecting the specific object features (e.g., buttons that need to be actuated to turn on the tool). The vast majority of two-dimensional (2D) and three-dimensional (3D) point cloud object representations used in the robotics industry are solely vision based (see the List of Incorporated Cited Literature References, Literature Reference Nos. 1 and 2). While such 3D models capture what an object looks like through a 3D sensor, they do not encode multi-modal information (e.g., how an object feels or sounds) that may be indicative for solving a task. Because of this limitation, when robots are tasked with manipulating objects (e.g., pressing a button), they're typically pre-programmed by the human user to apply the behavior at a hard-coded location on the object. Such an approach suffers from the obvious problem that the robot cannot adapt to novel objects, ones for which a hard-coded target location is not available.

Recently, some work has focused on enabling robots to detect tactile, proprioceptive (e.g., the set of joint torques of a robot arm), and acoustic object properties (see Literature Reference No. 3), but the drawbacks of those methods are that they fail to take the object's geometry into account and can only handle simple objects that have no degrees of freedom (e.g., cup, box), but not a stapler or a drill with a button, for instance.

The work described in Literature Reference No. 4 attempted to expand the aforementioned approaches. In their experiments, the robot was able to estimate the location of a button which, if pressed, produced a sound. The main limitation of that work, however, was that the robot's perception of the object (e.g., a doorbell button mounted on a flat surface) was only in 2D with the assumption that there was only one fixed frame of reference (i.e., the button had to be in a hard-coded initial location). In addition, to register a successful button press, the robot had to have a direct line of sight to its finger, an assumption that does not hold in practice.

Each of the prior methods described above exhibit limitations that make them incomplete. Thus, a continuing need exists for a process that produces a multi-modal 3D object representation that not only allows the detection of functional object features, but also opens the door for enabling robots to classify objects based on multi-modal sensory feedback as opposed to using just visual input.

SUMMARY OF THE INVENTION

The present invention relates to a system for identifying functional parts of objects for robotic manipulation and, more particularly, to a system for identifying functional parts of objects for robotic manipulation using tactile and auditory sensory feedback. The system comprises one or more processors and a memory having instructions such that when the instructions are executed, the one or more processors perform multiple operations. The system causes a robot to repeatedly manipulate an object, wherein the robot comprises an audio sensor and a plurality of touch sensors. A three-dimensional (3D) location of each audio event that produces a response as measured by the audio sensor during manipulation of the object is recorded. Additionally, a 3D location of each tactile event that produces a response as detected by the plurality of touch sensors during manipulation of the object is recorded. A 3D location of each audio and tactile event in 3D space is generated. A 3D audio point cloud denoting the 3D locations of the audio events is generated, and a 3D tactile point cloud denoting the 3D locations of the tactile events is generated. The 3D audio point cloud and the 3D tactile point cloud are registered with a 3D model point cloud of the object. Finally, the 3D model point cloud of the object is annotated with the audio events to generate an annotated 3D model point cloud of the object, which encodes the location of a functional element of the object.

In another aspect, a point in the 3D audio point cloud is labeled as positive if an audio event was detected, and a point in the 3D audio point cloud is labeled as negative if an audio event was not detected.

In another aspect, the 3D audio point cloud is merged with the 3D tactile point cloud to generate a 3D merged point cloud. The 3D merged point cloud is aligned with the 3D model point cloud of the object.

In another aspect, each point in the 3D model point cloud of the object is labeled with an estimated probability that an audio event will be detected if the robot manipulates the object at that point.

In another aspect, the estimated probability is determined as follows. $N(p_i)$ is defined as a set of points in the 3D audio point cloud which are within a predetermined distance of a point $p_i$. $m_{audio}$ is defined as a number of points in $N(p_i)$ for which an audio event was detected. $m_{audio}/|N(p_i)|$ is output.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A illustrates experimental results for a battery-powered drill according to the principles of the present invention;

FIG. 3B illustrates experimental results for a flashlight according to the principles of the present invention;

FIG. 3C illustrates experimental results for a stapler according to the principles of the present invention;

DETAILED DESCRIPTION

Figure 1:
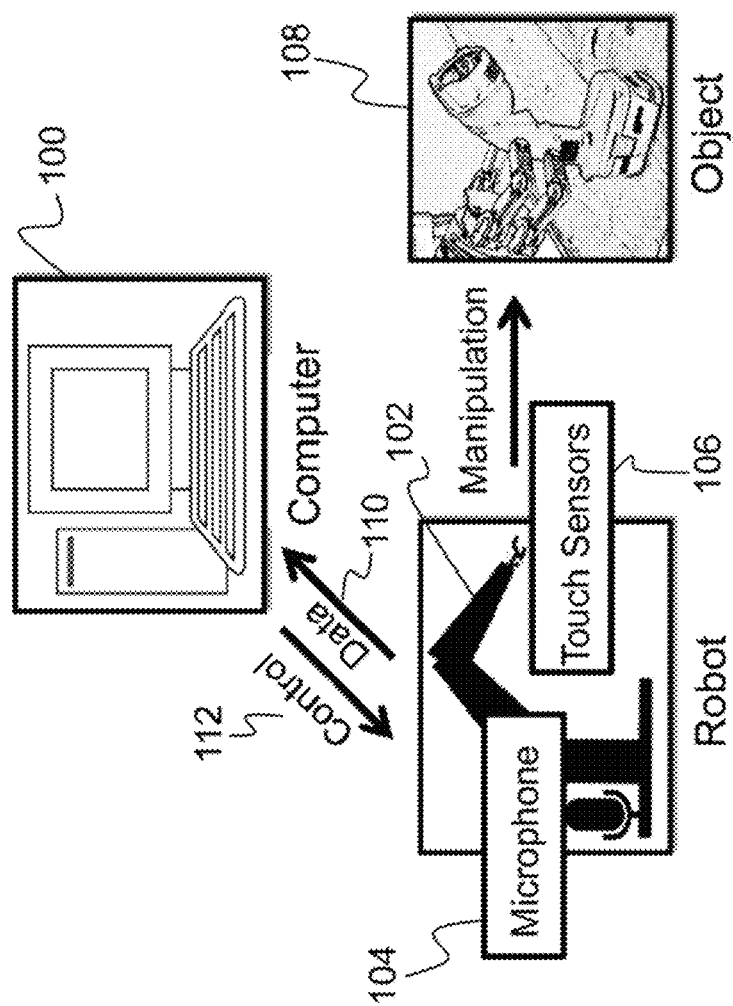
FIG. 1 illustrates an apparatus for creating a visual-audio-tactile point cloud according to the principles of present invention.

The present invention relates to a system for identifying functional parts of objects for robotic manipulation and, more particularly, to a system for identifying functional parts of objects for robotic manipulation using tactile and auditory sensory feedback. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. R. B. Rusu, Z. C. Marton, N. Blodow, M. Dolha, and M. Beetz. Towards 3D point cloud based object maps for household environments. *Robotics and Autonomous Systems*, 56(11):927-941, 2008.

2. B. Rasolzadeh, M. Bjorkman, K. Huebner, and D. Kragic. An active vision system for detecting, fixating and manipulating objects in the real world. International Journal of Robotics Research, 29(2-3):133-154, 2010.

3. Sinapov, J., Bergquist, T., Schenck, C., Ohiri, U., Griffith, S. and Stoytchev, A. Interactive object recognition using proprioceptive and auditory feedback, The International Journal of Robotics Research, Vol. 30(10):1250-1262, 2011.

4. Sukhoy, V., Sinapov, J., Wu, L., and Stoytchev, A. Learning to Press Doorbell Buttons, Proceedings of the 9th IEEE International Conference on Development and Learning (ICDL), 2010.

5. Rusu, R. B. and Blodow, N. and Beetz, M. Fast point feature histograms (FPFH) for 3D registration. Proceedings of the IEEE International Conference on Robotics and Automation, 2009.

6. Zhang, Z. Iterative Point Matching for Registration of Free-form Curves. Research Report No. 1658. Institut National de Recherche en Informatique et en Automatique (INRIA), France, 1992.

7. Frigo, M. and Johnson, S. G. FFTW: An adaptive software architecture for the FFT. Proceedings of the IEEE International Conference on Acoustics, Speech and Signal Processing, vol. 3, pp. 1381-1384, 1998.

8. Siciliano, B. and Khatib, O. (Eds.). Handbook of Robotics. Springer, 2008, pp. 18-27.

(2) Principal Aspects

The present invention has three "principal" aspects. The first is a system for identifying functional parts of an object for robotic manipulation. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for identifying functional parts of an object for robotic manipulation. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details

Described herein is a method for enabling a robot to detect the functional parts of hand-held tools (e.g., a button on a drill) using sensor feedback, such as tactile and auditory sensory feedback. In one aspect, the method consists of extracting auditory and tactile events detected while the robot manipulates an object, and mapping those events onto the object's three-dimensional (3D) point cloud model. The result of this process is a visual-action-tactile point cloud object representation which not only captures how an object looks, but also describes the functional components of the object (e.g., buttons) that produce, for instance, auditory and tactile feedback when pressed.

In one aspect, and as illustrated in FIG. 1, elements according to the principles of the present invention include the following: a computer 100, a robotic arm 102 with a dexterous hand as its end effector, an audio microphone 104 (or other action sensor, such as a visual sensor) on the robot, touch sensors 106 on the robot's fingers, and a database (or set) of 3D object models represented as 3D point clouds from the computer 100. As can be appreciated by one skilled in the art, "touch" may be realized by measuring stress, strain, pressure, or temperature though various tactile sensors. The robot needs to detect touch points, which can be realized through measurements of the aforementioned sensors.

Furthermore, in addition to tactile sensors, an audio microphone is a non-limiting example of a sensor that can be used to detect an action event by a functional feature. For instance, the action event by the functional feature could be a light going on or the sound a button makes when pressed. Any functional feature is possible, provided that the action event produced by the functional feature is an easily detectable event that happens when the robot interacts through touch with the object, and that it is measurable by a sensor.

The task of the robot is to estimate the parts of an object 108 that need to be pressed to manipulate the object 108 in a proper fashion. For example, if the object 108 is a battery-powered drill, the correct part that needs to be pressed is the power button. On the other hand, if the object 108 is a stapler, then the correct location is the tip at the front of the stapler. More specifically, the task of the robot is to rank each point in the 3D object point cloud based on the expected likelihood that a force at the point produces the desired action of the object 108. A set of data 110 obtained from the microphone 104 and the touch sensors 106 as the robot manipulates the object 108 is sent to the computer 100. The computer then controls 112 the actions of the robotic arm 102 based on the set of data 110.

Figure 2:
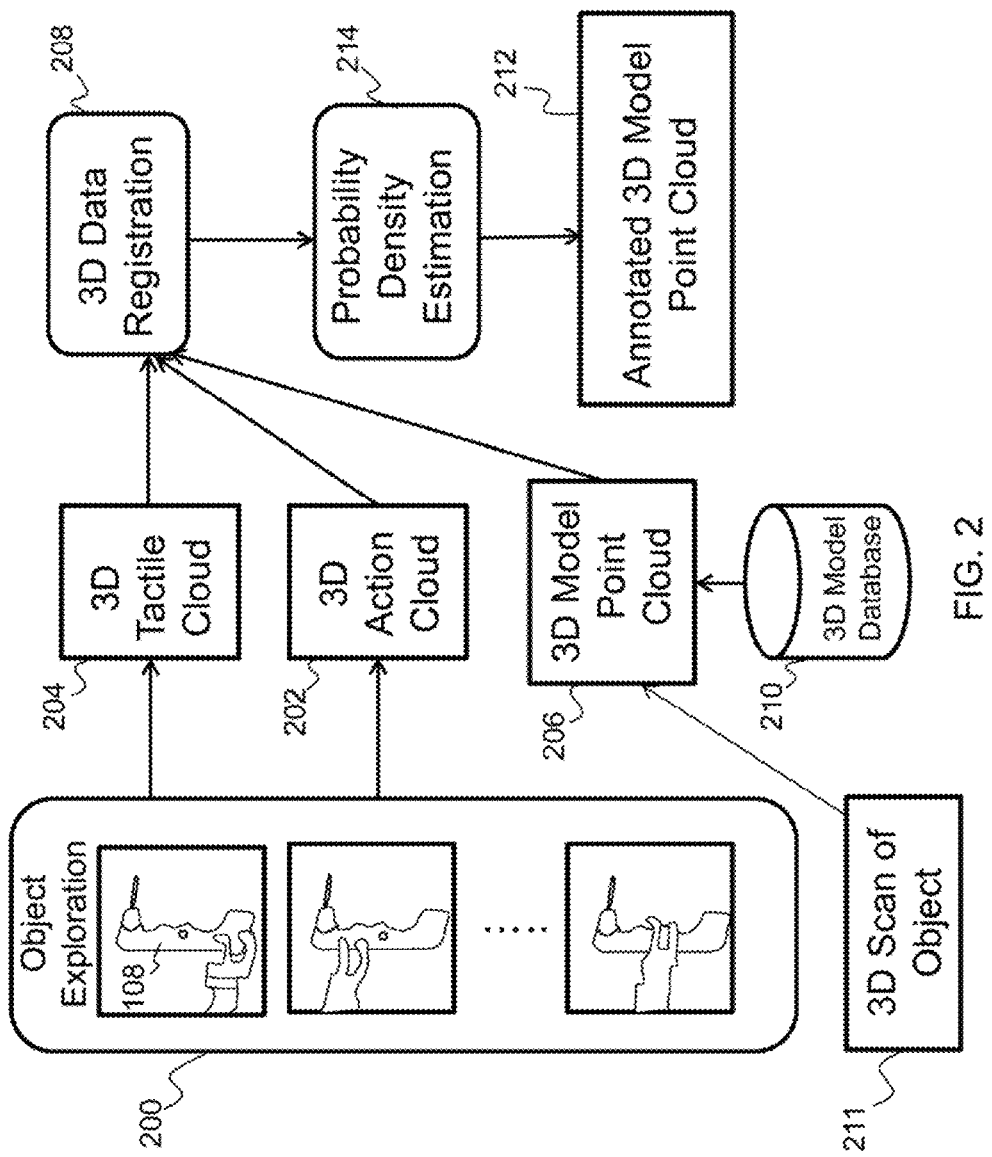
FIG. 2 illustrates the process for computing an annotated three-dimensional model point cloud encoding the location of a functional feature of the object according to the principles of the present invention.

As depicted in FIG. 2, the task of estimating the parts of an object is solved using a three-step process. The first step, an object exploration step 200, consists of repeatedly manipulating the object 108 and recording the 3D locations of observed tactile and sensory (e.g., auditory, visual) events detected by the robot's touch and other sensors (eg., audio sensors, visual sensors). Once such an event is detected, forward kinematics is applied on the robot's joint angles to determine the event's location in 3D space. The forward kinematics of a robot arm is a mapping of the joint angles onto the robot's finger positions in Cartesian space. Forward kinematics is described, for example, in Literature Reference No. 8. The end result of this procedure is a 3D point cloud $C_a$ (3D action cloud 202) denoting the 3D locations of functional action events (e.g., hearing a button click), and a 3D point cloud $C_t$ (3D tactile cloud 204) denoting the 3D locations of tactile events corresponding to the robot's fingers touching the object 108. In one aspect, the 3D action cloud 202 is an "audio cloud." However, as another non-limiting example, the 3D action cloud 202 may consist of touch points that occurred simultaneously with another event (e.g., light goes on or sound goes on).

Each point in the action cloud $C_a$ (3D action cloud 202) is labeled as either positive (e.g., a point at which sound was detected) or negative (e.g., a point at which no sound was detected). A functional event may include an audio event; however, the audio event is not limited to the sound a button may make. For example, when pressing the button on a drill, the drill motor makes the sound, and that audio event can be recorded.

The second step of the process consists of registering the 3D action and tactile point clouds, $C_a$ (3D action cloud 202) and $C_t$ (3D tactile cloud 204) with the 3D model point cloud $C_m$ 206 of the object 108 in a 3D data registration step 208 so that all three point clouds reside in the same frame of reference. In one aspect, the 3D model point cloud $C_m$ 206 is obtained from a 3D model database 210 of 3D object models represented as 3D point clouds. Alternatively, the 3D model point cloud $C_m$ 206 may be obtained directly from a 3D scan of an object 211 using a 3D sensor. Additionally, the 3D model point cloud $C_m$ 206 may be downloaded from a public database on the Internet. This stage is completed by merging the clouds $C_a$ (3D action cloud 202) and $C_t$ (3D tactile cloud 204) and aligning the resulting cloud, $C_{a+t}$ with the 3D model point cloud $C_m$ 306. As a non-limiting example, to compute the alignment, the sample consensus initial alignment (SAC-IA) algorithm is first applied on the input data which produces an initial alignment between the clouds $C_{a+t}$ and the 3D model point cloud $C_m$ 306. Literature Reference No. 5 provides an example of a SAC-IA algorithm. Once the initial alignment is computed, it is optimized for 3D registration using the iterative closest point (ICP) algorithm. Literature Reference No. 6 describes a non-limiting example of an ICP algorithm. The result is a transformation matrix, M, which can be used to transform the clouds $C_a$ (3D action cloud 202) and $C_t$ (3D tactile cloud 204) into the same frame of reference as the 3D model point cloud $C_m$ 306.

The last step in the process is to annotate the 3D model point cloud $C_m$ 306 with the observed action events in the cloud $C_a$ (3D action cloud 202) to produce an annotated 3D model point cloud 212. More specifically, in a probability density estimation step 214, each point $p_i$ in the 3D model point cloud $C_m$ 306 will be labeled with the estimated probability that an action event will be observed if a behavior is applied on that point (e.g., P (audio event $p_i$)). This probability is estimated as follows:

Input: 3D point $p_i$ from point cloud $C_m$ 306
Output: P (probability of audio event at $p_i$)
1. Let $N(p_i)$ be the set of points in $C_a$ (3D action cloud 202) which are d centimeters (cm) or closer to the point $p_i$ for a suitably chosen parameter d, depending on the density of the point cloud. As a non-limiting example, d=5 cm was chosen.

2. Let $m_{audio}$ be the number of points in $N(p_i)$ for which an auditory event was observed.
3. Return $m_{audio}/|N(p_i)|$ as the output.

The annotated 3D model point cloud 212 encodes the location of the functional feature (e.g., a power button) of the object 108.

In an alternative embodiment, instead of sound as the functional event, there could be a visual feedback of some sort, such as pressing a button and a lid pops open. Importantly, the touch points must be associated with some effect, audio or visual.

The system according to the principles of the present invention was evaluated using an upper-torso humanoid robot. The robot's arm consisted of a 7 degree-of-freedom (DOF) Barrett Whole Arm Manipulator (WAM) with the 3-fingered Barrett Hand as its end effector. Each of the three fingers included a 4×6 tactile sensor array (i.e., touch sensors, element 106) used to receive tactile feedback. The robot was also equipped with two U853AW hanging microphones (element 104).

The system was tested on three different objects: a battery-powered drill, a flashlight, and a stapler. The robot manipulated the drill and the flashlight by closing two of its fingers until a contact was felt. Once contact was detected, the 3D forward kinematics location was computed for the corresponding finger and the resulting point was added to the tactile cloud for that object (element 204). Once the two fingers had established contact, the third finger performed a pressing behavior. If action feedback was detected (e.g., the sound of the drill turning on, or the click of the flashlight's button), the computed 3D point of the finger was added to the action cloud (element 202) with a positive label (+). If no action (e.g., audio) feedback occurred, then the point was added to the action cloud (element 202) with a negative label (−).

To manipulate the stapler, the robot's palm pressed down at different locations on top of the stapler. As with the other two objects, if action feedback was detected, the 3D forward kinematics location of the robot's palm was added to the action cloud With a positive label (+), while if the stapling action was unsuccessful, the point was added with a negative label (−). The tactile cloud of the stapler was extracted by touching the stapler with the robot's fingers at various locations. The objects were kept in the same place on the table in front of the robot for all of the robot's attempts to manipulate them at various locations.

In experimental studies, a raw audio signal was processed using a Fast Fourier Transform (FFT) (see Literature Reference No. 7 for a description of a FFT), resulting in 129 frequency channels. First, a background model was estimated such that for each channel, the model estimates the mean and standard deviation. The background model was then used to detect events by looking at whether a new FFT matches the background model or not. Given a new FFT sample (e.g., a 129-dimensional vector), the sample is considered an event if 20% or more of the values differ by more than 2.5 standard deviations from their expected means, for instance. The exact same background model was later adapted for the tactile sensors. However, instead of 129 channels, with the tactile data there are 6×4=24 channels for each finger pad.

The results of the experiment are illustrated in FIGS. 3A-3C, which depict the battery-powered drill 300, the flashlight 302, and the stapler 304, and the resulting annotated 3D model point clouds 212. The area enclosed by dashed lines 306 in each annotated 3D model point cloud 212 signifies points at which applying the behavior (e.g., pressing with a finger for the drill and flashlight, pressing down with the palm for the stapler) is likely to produce a sound. The remaining areas of the annotated 3D model point clouds 212 correspond to locations at which the likelihood of detecting a sound is low. The results show that the present invention can detect the functionally important features on the objects' 3D models.

Figure 4:
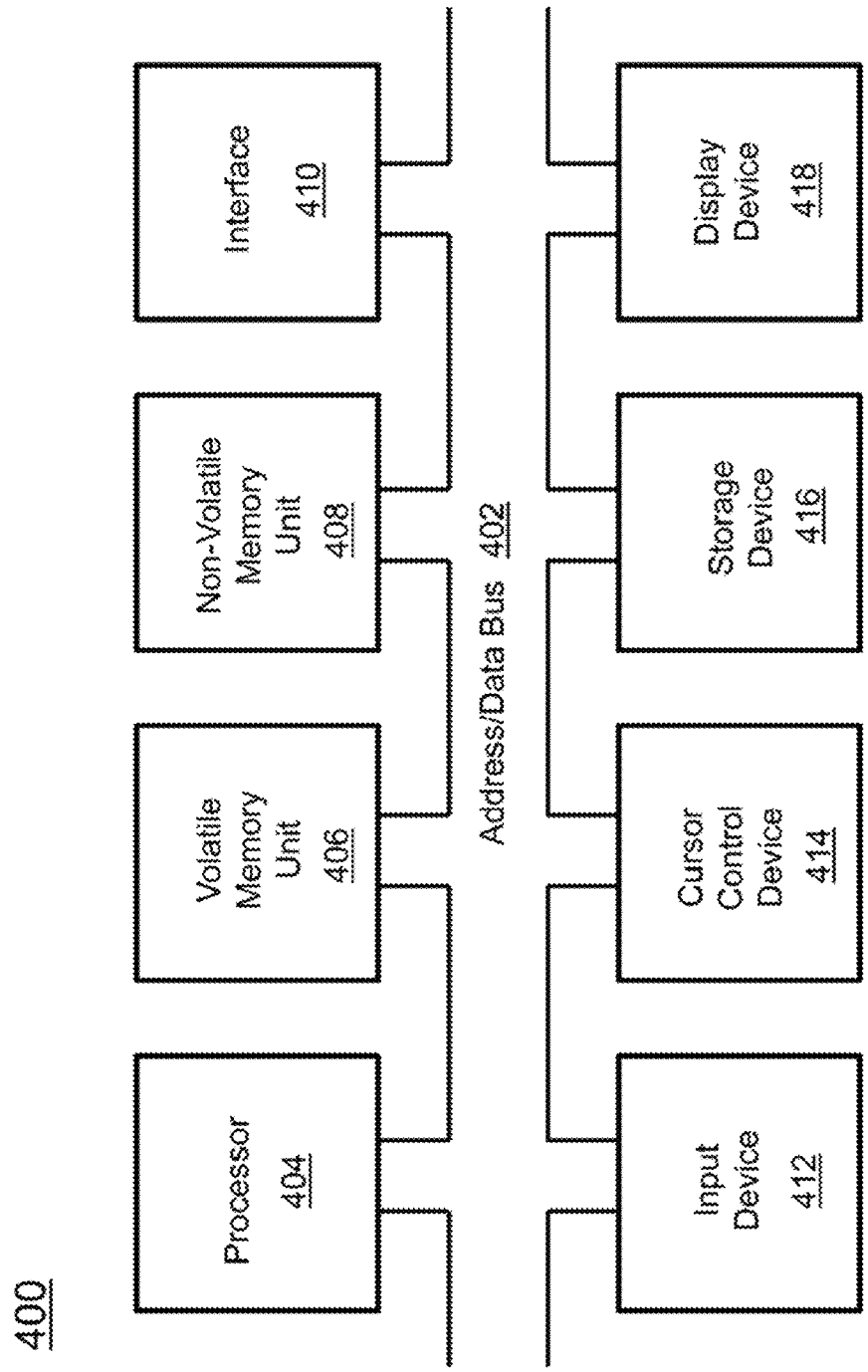
FIG. 4 is an illustration of a data processing system according to the principles of the present invention.

An example of a computer system 400 in accordance with one aspect is shown in FIG. 4. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404, are coupled with the address/data bus 402. The processor 404 is configured to process information and instructions. In one aspect, the processor 404 is a microprocessor. Alternatively, the processor 404 may be a different type of processor such as a parallel processor, or a field programmable gate array.

The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In an embodiment, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 400. In accordance with one aspect, the input device 412 is an alpha-numeric input device, such as a keyboard, that may include alphanumeric and/or function keys. Alternatively, the input device 412 may be an input device other than an alphanumeric input device. In one aspect, the computer system 400 may include a cursor control device 414 coupled with the address/data bus 402, wherein the cursor control device 414 is configured to communicate user input information and/or command selections to the processor 400. In one aspect, the cursor control device 414 is implemented using a device such as a mouse, a track-ball, a track-pad, an optical tracking device, or a touch screen. The foregoing notwithstanding, in one aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In one aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In one aspect, the display device 418 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 400 presented herein is an example computing environment in accordance with one aspect. However, the non-limiting example of the computer system 400 is not strictly limited to being a computer system. For example, one aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
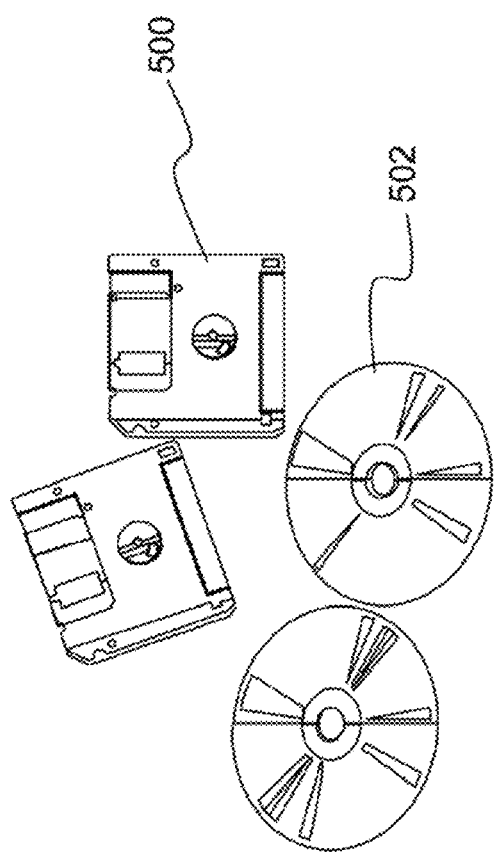
FIG. 5 is an illustration of a computer program product according to the principles of the present invention.

An illustrative diagram of a computer program product embodying an aspect of the present invention is depicted in FIG. 5. As a non-limiting example, the computer program product is depicted as either a floppy disk 500 or an optical disk 502. However, as mentioned previously, the computer program product generally represents computer readable code (i.e., instruction means or instructions) stored on any compatible non-transitory computer readable medium.

What is claimed is:

1. A system for identifying functional elements of an object for robotic manipulation, the system comprising one or more processors and a non-transitory computer-readable medium having executable instructions encoded thereon such that when the instructions are executed, the one or more processors perform operations of:
   causing a robot to repeatedly manipulate an object, wherein the robot comprises an audio sensor and a plurality of touch sensors;
   recording a three-dimensional (3D) location of each audio event that produces a response as measured by the audio sensor during manipulation of the object;
   recording a 3D location of each tactile event that produces a response as detected by the plurality of touch sensors during manipulation of the object;
   determining a 3D location of each audio and tactile event in 3D space;
   generating a 3D audio point cloud denoting the 3D locations of the audio events;
   generating a 3D tactile point cloud denoting the 3D locations of the tactile events;
   registering the 3D audio point cloud and the 3D tactile point cloud with a 3D model point cloud of the object; and
   annotating the 3D model point cloud of the object with the audio events to generate an annotated 3D model point cloud of the object, which encodes the location of a functional element of the object.

2. The system as set forth in claim 1, wherein the one or more processors further perform operations of:
   labeling a point in the 3D audio point cloud as positive if an audio event was detected; and
   labeling a point in the 3D audio point cloud as negative if an audio event was not detected.

3. The system as set forth in claim 2, wherein the one or more processors further perform operations of:
   merging the 3D audio point cloud with the 3D tactile point cloud to generate a 3D merged point cloud; and
   aligning the 3D merged point cloud with the 3D model point cloud of the object.

4. The system as set forth in claim 3, wherein the one or more processors further perform an operation of labeling each point in the 3D model point cloud of the object with an estimated probability that an audio event will be detected if the robot manipulates the object at that point.

5. The system as set forth in claim 4, wherein one or more processors further perform an operation of determining the estimated probability as follows:
   defining $N(p_i)$ as a set of points in the 3D audio point cloud which are within a predetermined distance of a point $p_i$;
   defining $m_{audio}$ as a number of points in $N(p_i)$ for which an audio event was detected; and
   outputting $m_{audio}/|N(p_i)|$.

6. A computer-implemented method for identifying functional elements of an object for robotic manipulation, comprising an act of causing a data processor to execute instructions stored on a non-transitory memory such that upon execution, the data processor performs operations of:
   causing a robot to repeatedly manipulate an object, wherein the robot comprises an audio sensor and a plurality of touch sensors;
   recording a three-dimensional (3D) location of each audio event that produces a response as measured by the audio sensor during manipulation of the object;
   recording a 3D location of each tactile event that produces a response as detected by the plurality of touch sensors during manipulation of the object;
   determining a 3D location of each audio and tactile event in 3D space;
   generating a 3D audio point cloud denoting the 3D locations of the audio events;
   generating a 3D tactile point cloud denoting the 3D locations of the tactile events;
   registering the 3D audio point cloud and the 3D tactile point cloud with a 3D model point cloud of the object; and
   annotating the 3D model point cloud of the object with the audio events to generate an annotated 3D model point cloud of the object, which encodes the location of a functional element of the object.

7. The method as set forth in claim 6, wherein the data processor further performs operations of:
merging the 3D audio point cloud with the 3D tactile point cloud to generate a 3D merged point cloud; and
aligning the 3D merged point cloud with the 3D model point cloud of the object.

8. The method as set forth in claim 7, wherein the data processor further performs operations of:
merging the 3D audio point cloud with the 3D tactile point cloud to generate a 3D merged point cloud; and
aligning the 3D merged point cloud with the 3D model point cloud of the object.

9. The method as set forth in claim 8, wherein the data processor further performs an operation of labeling each point in the 3D model point cloud of the object with an estimated probability that an audio event will be detected if the robot manipulates the object at that point.

10. The method as set forth in claim 9, wherein the data processor further performs an operation of determining the estimated probability as follows:
defining $N(p_i)$ as a set of points in the 3D audio point cloud which are within a predetermined distance of a point $p_i$;
defining $m_{audio}$ as a number of points in $N(p_i)$ for which an audio event was detected; and
outputting $m_{audio} / |N(p_i)|$.

11. A computer program product for identifying functional elements of an object for robotic manipulation, the computer program product comprising computer-readable instructions stored on a non-transitory computer-readable medium that are executable by a computer having a processor for causing the processor to perform operations of:
causing a robot to repeatedly manipulate an object, wherein the robot comprises an audio sensor and a plurality of touch sensors;
recording a three-dimensional (3D) location of each audio event that produces a response as measured by the audio sensor during manipulation of the object;
recording a 3D location of each tactile event that produces a response as detected by the plurality of touch sensors during manipulation of the object;
determining a 3D location of each audio and tactile event in 3D space;
generating a 3D audio point cloud denoting the 3D locations of the audio events;
generating a 3D tactile point cloud denoting the 3D locations of the tactile events;
registering the 3D audio point cloud and the 3D tactile point cloud with a 3D model point cloud of the object; and
annotating the 3D model point cloud of the object with the audio events to generate an annotated 3D model point cloud of the object, which encodes the location of a functional element of the object.

12. The computer program product as set forth in claim 11, further comprising instructions for causing the processor to perform operations of:
labeling a point in the 3D audio point cloud as positive if an audio event was detected; and
labeling a point in the 3D audio point cloud as negative if an audio event was not detected.

13. The computer program product as set forth in claim 12, further comprising instructions for causing the processor to perform operations of:
merging the 3D audio point cloud with the 3D tactile point cloud to generate a 3D merged point cloud; and
aligning the 3D merged point cloud with the 3D model point cloud of the object.

14. The computer program product as set forth in claim 13, further comprising instructions for causing the processor to perform an operation of labeling each point in the 3D model point cloud of the object with an estimated probability that an audio event will be detected if the robot manipulates the object at that point.

15. The computer program product as set forth in claim 14, further comprising instructions for causing the processor to perform an operation of determining the estimated probability as follows:
defining $N(p_i)$ as a set of points in the 3D audio point cloud which are within a predetermined distance of a point $p_i$;
defining $m_{audio}$ as a number of points in $N(p_i)$ for which an audio event was detected; and
outputting $m_{audio}/|N(p_i)|$.

* * * * *